US006919889B2

(12) United States Patent
Grzeszczuk et al.

(10) Patent No.: US 6,919,889 B2
(45) Date of Patent: Jul. 19, 2005

(54) COMPRESSION OF SURFACE LIGHT FIELDS

(75) Inventors: Radek Grzeszczuk, Menlo Park, CA (US); Alexey Smirnov, Dzerzhinsk (RU); Michael H. Chu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 488 days.

(21) Appl. No.: 10/177,529

(22) Filed: Jun. 21, 2002

(65) Prior Publication Data

US 2003/0234783 A1 Dec. 25, 2003

(51) Int. Cl.$^7$ .............................................. G06T 17/00
(52) U.S. Cl. ..................................................... 345/420
(58) Field of Search ................................ 345/419, 420, 345/426, 427, 582, 581, 645, 646, 424

(56) References Cited

U.S. PATENT DOCUMENTS 6,791,542 B2 * 9/2004 Matusik et al. ............. 345/420
6,803,910 B2 * 10/2004 Pfister et al. ............... 345/420

OTHER PUBLICATIONS

Bishop, C.M.; Neural Networks for Pattern Recognition; Clarendon Press; pp. 310–320, 1995.
Buehler, C., Bosse, M., McMillan, L., Gortler, S.J., and Cohen, M.F.; Unstructured Lumigraph Rendering; Proceedings of SIGGRAPH 2001; pp. 425–432; Aug. 12, 2001.
Cabral, B., Olano, M., and Nemec, P.; Reflection Space Image Based Rendering; Proceedings of SIGGRAPH 99, Computer Graphics Proceedings, Annual Conference Series, ACM SIGGRAPH / Addison Wesley Longman; pp. 165–170; 1999.
Chen, W., Bouget, J., Chu, M. and Grzeszczuk, R.; Light Field Mapping: Efficient Representation and Hardware Rendering of Surface Light Fields; To Appear in the ACM SIGGRAPH 2002 conference proceedings; 2002.
Dana, K.J., van Ginneken, B., Nayer, S.K., and Koenderink, J.J.; Reflectance and texture of real–world surfaces; ACM Transactions on Graphics 18, 1 (Jan., 1999); pp. 1–34.
Debevec, P., Hawkins, T., Tchou, C., Duiker, H.-P., Sarokin, W., and Sagar, M; Acquiring the Reflectance Field of a Human Face; Proceedings of SIGGRAPH 2000 (Jul. 2000); pp. 145–156.
Debevec, P.E., Taylor, C.J., and Malik, J.; Modeling and Rendering Architecture from Photographs: A Hybrid Geometry– and Image–Based Approach; Proceedings of SIGGRAPH 96; pp. 11–20; 1996.

(Continued)

Primary Examiner—Almis Jankus
(74) Attorney, Agent, or Firm—Hanley, Flight & Zimmerman, LLC

(57) ABSTRACT

A technique for compactly representing the surface radiance characteristics of an object based on acquired images of the object includes calculating surface radiance functions, which are then partitioned, based on a mesh topology, into vertex radiance functions. The vertex radiance functions are then reparameterized, on a vertex-by-vertex basis, to local coordinates systems. The reparameterized vertex radiance functions, which may be six-dimensional, are then decomposed into a plurality of lower dimensional functions that may be compactly stored.

29 Claims, 11 Drawing Sheets

OTHER PUBLICATIONS

Debevec, P.E., Yu, Y., and Borshukov, G.D.; Efficient View–Dependent Image–Based Rendering with Projective Texture–Mapping; Eurographics Rendering Workshop 1998, pp. 105–116; 1998.

Fournier, A.; Separating Reflection Functions for Linear Radiosity. Eurographics Rendering Workshop 1995; pp. 296–305; Jun. 1995.

Gortler, S.J., Grzeszczuk, R., Szeliski, R., and Cohen, M.F.; The Lumigraph; Proceedings of SIGGRAPH 96; pp. 43–54; 1996.

U.S. Appl. No. 09/757,951, filed Jan. 9, 2001, Grzeszczuk et al. entitled Compression of Surface Light Fields.

U.S. Appl. No. 09/757,161, filed Jan. 9, 2002, Grzeszczuk et al. entitled "Hardware Accelerated Visualization of Surface Fields."

Heidrich, W., Daubert, K., Kautz, J., Seidel, H.; Illuminating MicroGeometry Based on Precomputed Visibility; ACM SIGGRAPH 2000.

Heidrich, W. Seidel, H.; Realistic, Hardware–Accelerated Shading and Lighting. Proceedings of SIGGRAPH 99; pp. 171–178; Aug. 1999.

Intel Math Kernel Library; Intel Corporation; http://developer.intel.com/software/products; printed Jun. 11, 2003.

Kautz, J. and McCool M.; Interactive Rendering with Arbitrary BRDFs Using Separable Approximations; Eurographics Rendering Workshop; Jun. 1999.

Kautz, J., and Seidel, H.–P.; Towards Interactive Bump Mapping with Anisotropic Shift Variant BRDFs; SIGGRAPH/Eurographics Workshop on Graphics Hardware; pp. 51–58; 2000.

Kautz, J., Vazquez, P.–P., Heidrich, W., and Seidel, H.–P.; A Unified Approach to Prefiltered Environment Maps; Rendering Techniques 2000: 11th Eurographics Workshop on Rendering; Eurographics; pp. 185–196; 2000.

Lee, D. and Seung, H.S.; Learning the Parts of Objects By Non–Negative Matrix Factorization; Nature, vol. 401; pp. 788–791; 1999.

Lensch, H.P. A., Kautz, J., Goesele, M., Heidrich, W., and Seidel, H.–P.; Image–Based Reconstruction of Spatially Varying Materials; In Twelveth Eurographics Rendering Workshop 2001; Eurographics; pp. 104–115; 2001.

Levoy, M. and Hanrahan, P.; Light Field Rendering; Proceedings of SIGGRAPH 96; pp. 31–42; 1996.

Nishino, K., Sato, Y., and Ikeuchi, K.; Eigen–Texture Method: Appearance Compression Based on 3D Model; International Conference on Computer Vision; pp. 38–45; 1999.

Roweis, S.; EM Algorithms for PCA and SPCA; Advances in Neural Information Processing Systems, vol. 10; MIT Press; 1998.

* cited by examiner

COMPRESSION OF SURFACE LIGHT FIELDS

TECHNICAL FIELD

This disclosure relates to computer graphics and, more particularly, to techniques for compressing surface light fields representing an object from multiple view points under multiple lighting locations.

BACKGROUND

Image synthesis, which may be used, for example, when creating computer graphics for video games, web pages and the like, is typically carried out using techniques based either on analytical models or on acquired images of a physical object. Not only must the synthesized images accurately represent the shape and color of the physical object, the synthesized images must accurately represent the ways in which the physical object reflects light (e.g., the radiance of the object). As described below, techniques based on analytical models, as well as those based on acquired images, have shortcomings.

One technique that is based on analytical models is performed using global illumination techniques, which combine light transport simulation with analytic material reflectance models to achieve simple, compact and flexible representation of three-dimensional (3D) scenes or objects. Global illumination techniques are computationally efficient once the analytical models have been developed, and, therefore, are easily rendered to create real-time graphics. However, analytical material reflectance models and, therefore, global illumination imaging based on such reflectance models are costly to compute and difficult to develop.

Image-based techniques have recently emerged as an alternative approach to creating costly analytical models for realistic image synthesis. Image-based techniques synthesize images based on graphical information of an object. Such graphical information may include pixel information of the object from a digital camera or from a scanner. Image-based techniques represent radiance data directly in a sample-based format without using any analytical models and, therefore, have gained popularity because they promise simple acquisition of 3D models and an accurate portrayal of physical objects and the physical world.

Presently, image-based techniques process data from, for example, a number of digital camera acquisitions taken from different angles while a lighting source is located in a fixed position. For example, an object may be digitally photographed from thirty or more different angles or positions, while a light source illuminating the object is held in a fixed position. As will be appreciated, the information of an object developed by the digital camera may occupy several megabytes (MB) of storage space, making it difficult or impractical for a website or a computer graphics intensive game to render the object in real time. Additionally, the fixed lighting position leads to acquired images having fixed illumination thereon. Such images do not always realistically reproduce how the object would appear under diverse lighting conditions.

DETAILED DESCRIPTION

Although the following discloses an example of one system including software executed on hardware, it should be noted that such a system is merely illustrative and should not be considered to be limiting. For example, it is contemplated that the disclosed functionality could be embodied exclusively in dedicated hardware, exclusively in software, exclusively in firmware or in some combination of hardware, firmware and/or software. Accordingly, while the following describes one example of a system, the example is not the only way to implement such a system.

Figure 1:
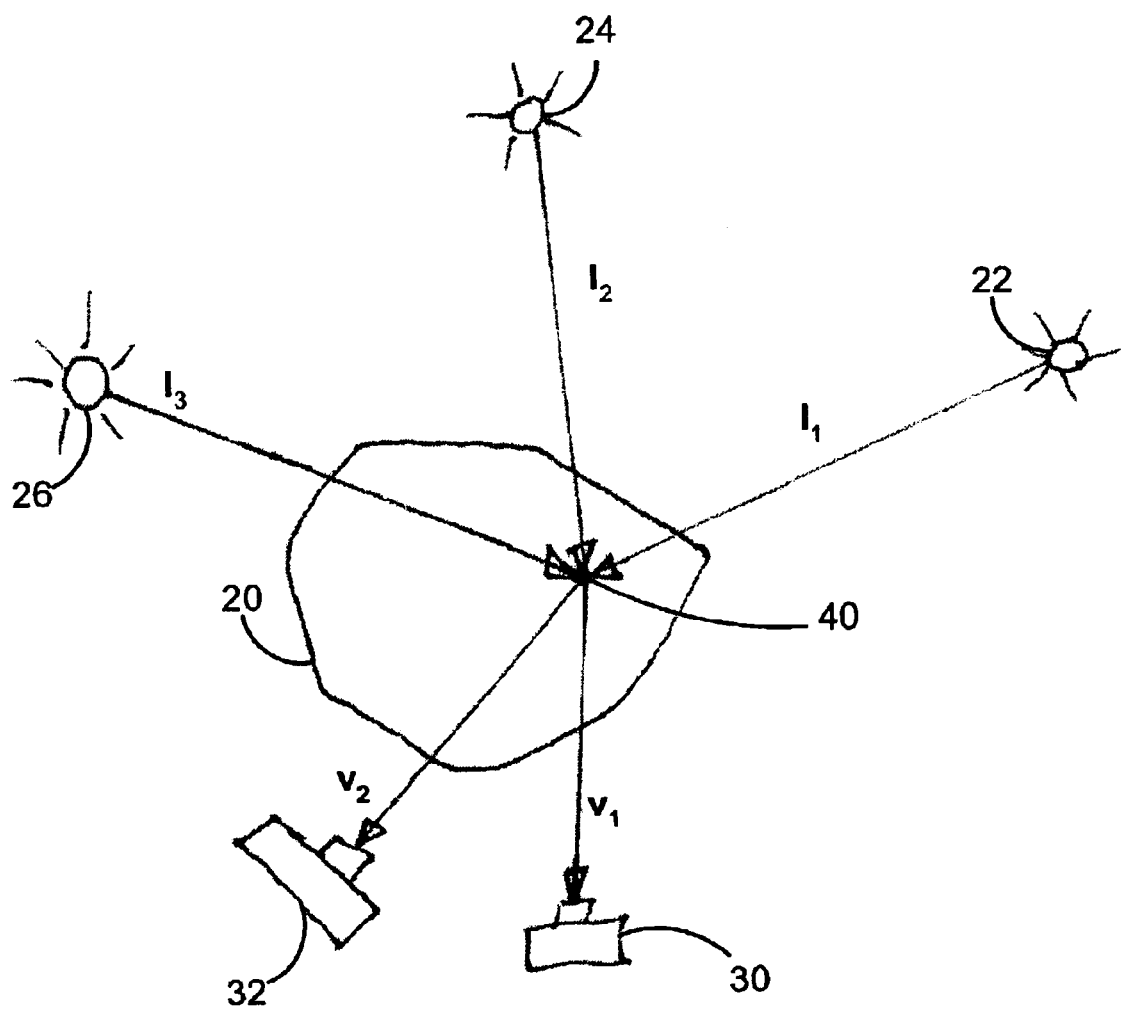
FIG. 1 illustrates an example object illuminated from a number of different positions and digitally captured from a number of different positions.

Turning now to FIG. 1, an object 20 that is to be processed using image-based acquisition may be illuminated at any one time by any one of a number of light sources, three of which are shown at reference numerals 22, 24 and 26. While the object 20 is illuminated by one of the light sources 22–26, one or more digital cameras 30, 32 may be used to acquire images of the object. For example, the camera 30 may acquire one image while the light source 22 is powered and may likewise acquire single images while each one of the light sources 24 and 26 are individually powered. The camera 30 may then be moved to a different position, where the camera 30 will acquire three more images, one while each of the light sources 22–26 is powered. As will be readily appreciated, any suitable number of lighting positions and camera positions may be used. For example, thirty camera positions may be selected and thirty lighting positions may be selected, wherein a camera acquires one image under each light source for each of the thirty light source positions and each of the thirty camera positions. As will be further appreciated, such a process will result, for example, in the acquisition of 900 images, each of which may be one or more megabytes in size.

While images of the entire object 20 are acquired, for purposes of discussion particular attention will be paid to an example point 40 of the object 20. Thus, the remaining disclosure herein pertains to the point 40 and the way with which image data for the point 40 is processed. For example, as shown in FIG. 1, the light sources 22–26 illuminate the point 40 with vectors $l_1$–$l_3$, respectively. Additionally, the point 40 is perceived by the cameras 30 and 32 with vectors $v_1$ and $v_2$, respectively.

A bidirectional surface radiance function (BSRF) is used to represent the outgoing radiance of substantially every surface point $s=(u, v)$ to be modeled on the object 20 in every light source direction $l=(\theta_i, \phi_i)$ and every viewing direction $v=(\theta_o, \phi_o)$. The BSRF function is a six-dimensional (6D) function that may be represented as a function of three two dimensional (2D) vectors, as shown in Equation 1.

$$f(u, v, \phi_i, \theta_i, \phi_o, \theta_o)=f(s, l, v) \qquad \text{Equation 1}$$

Complex global illumination effects, such as, for example, inter-reflections, translucency and self-shadowing, are inherent in the BSRF representation and further enhance the realism of 3D scenes rendered to a viewer. As described in detail below, rendering using BSRFs comprises modulating each sample of the BSRF function by the light source intensity E(l) as shown in Equation 2.

$$I(s, l, v)=\int_v f(s, l, v) \cdot E(l) dl \qquad \text{Equation 2}$$

Because under the BSRF formulation, each modeled surface point can have a unique reflectance property, the BSRF representation is ideally suited for modeling the reflectance properties of physical objects and scenes scanned through 3D photography. Scanned objects are often characterized by fine surface details, called micro-geometry, that are difficult or impossible to scan. Using BSRF, the lighting effects that the micro-geometry has on the object appearance can be represented. Accordingly, the BSRF has the effect of both simplifying the acquisition process and improving the visual fidelity of the scanned objects.

Because BSRFs are large and have high dimensionality, it is not possible to perform direct representation and manipulation of BSRFs. Accordingly, as described in detail below, in the illustrated system, BSRFs are separably factorized, or decomposed, and light field mapped. Techniques of separable factorization are described in detail in Kautz, J., "Interactive Rendering with Arbitrary BRDFs using Separable Approximations," Eurographics Rendering Workshop 1999 (June 1999) and light field mapping techniques are addressed in Chen, "Light Field Mapping: Efficient Representation and Hardware Rendering of Surface Light Fields," To Appear in the Proceedings of SIGGRAPH 2002 (July 2002).

More specifically, the disclosed system approximates the BSRF function $f$ as a sum of lower dimensional products, called maps. In particular, as shown in Equation 3, variables g, $\alpha$, and $\beta$ represent surface, light and view maps, respectively.

$$f(s, l, v) \cong \sum_{i=1}^{k} g_i(s)\alpha_i(\omega_1)\beta_i(\omega_2) \qquad \text{Equation 3}$$

In Equation 3, $\omega_1$ and $\omega_2$ are the reparameterized vectors l and v, respectively, which as described below, are reparameterized based on the portioning used for breaking down the BSRF. In Equation 3, the variable k represents a small integer that is the number of sums, or approximation terms, used to represent the BSRF. In general, BSRF approximations are compact, accurate approximations that are formed by partitioning the BSRF data across small surface primitives and building the approximations for each primitive independently. The BSRF partitioning is carried out in such a way as to ensure substantially continuous approximations across neighboring surface elements. As described below, a reparameterization scheme may be used to improve further the separability of BSRF data.

Figure 2:
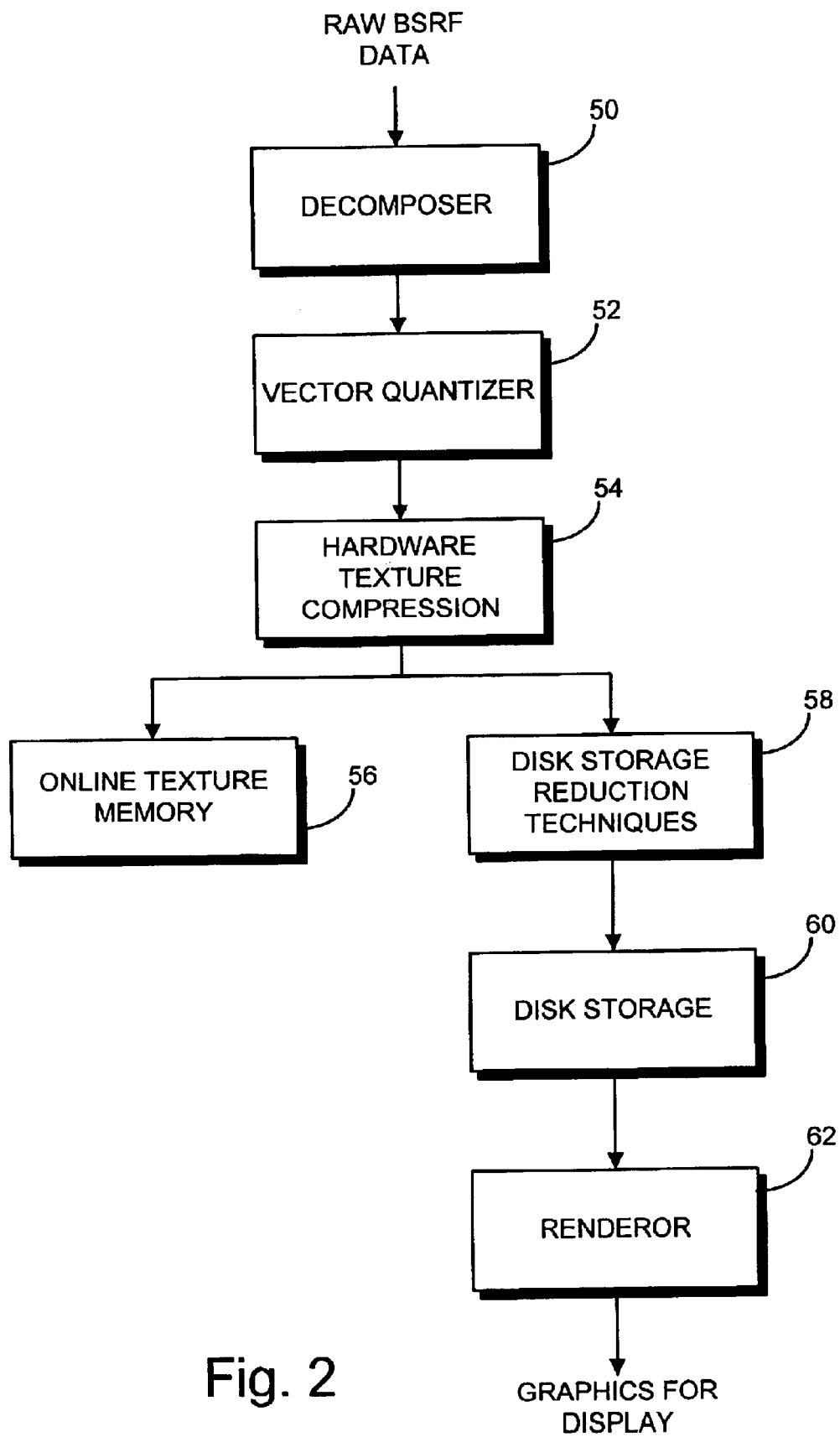
FIG. 2 is a diagram illustrating example data flow through the disclosed system.

In general, as shown in FIG. 2, raw BSRF data is provided to a decomposer 50, which, as described in detail below, decomposes the BSRF data into a sum of products and passes the result of the decomposition to a quantizer 52. The decomposition of the BSRF data may alone lead to a 100:1 data compression. The vector quantizer 52, which may be any standard run-time memory reduction technique, may further compress the data by a factor of 10:1. Further, hardware texture compression techniques (block 54) may also be used to provide additional compression on the order of 6:1. As will be appreciated, significant compression, which may be on the order of 6000:1 or higher, may be achieved. This compression is significant given the large amount of data required to represent a complete BSRF without decomposition.

After hardware texture compression is performed at block 54, the results thereof may be passed to online texture memory 56 for storage or may be passed to further disk storage reduction techniques 58 before being written to disk storage 60. When the time is appropriate, a renderor 62 accesses the disk storage 60 to recall the decomposed and compressed graphics information stored therein generates graphics for display therefrom.

Although FIG. 2 shows a number of structures linked together in one example manner, it will be appreciated by persons of ordinary skill in the art that some of the structures may reside apart from the remaining structures of FIG. 2. For example, the renderor 62 may reside separately from the decomposer 50 and vector quantizer 52.

Figure 3:
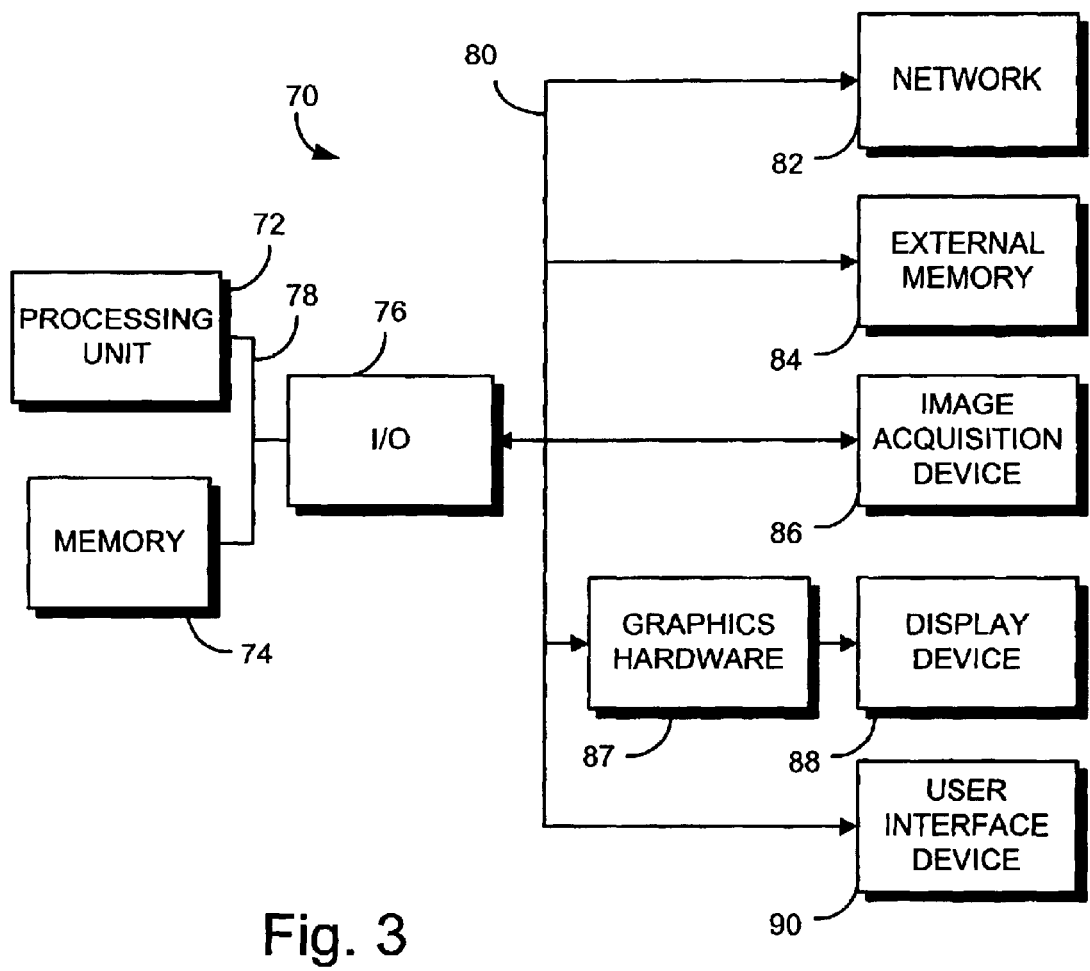
FIG. 3 is a block diagram illustrating example hardware on which the disclosed system may be implemented.

As shown in FIG. 3, an example hardware system 70 on which the system of FIG. 2 may be implemented includes a processing unit 72, a memory 74 and an input/output circuit 76 that may be coupled via a first communication bus 78. The input/output circuit 76 is further coupled, via a second communication bus 80, to a number of other components that may include, for example, a network 82, an external memory 84, an image acquisition device 86, graphics hardware 87, a display device 88 and a user interface device 90.

In practice, the components 72–76 may be implemented by a conventional personal computer, a workstation or in any other suitable computing device. The network 82 may be implemented by an intranet, the Internet or in any other network that allows the exchange of data across distances. The external memory 84 may be implemented by any suitable magnetic, electrical or optical media-based device. For example, the external memory 84 may be implemented by a floppy disk, a hard disk, a read/write compact disk (CD), a zip disk or any other suitable device or media. The image acquisition device 86 may be implemented by a flatbed or any other type of scanner and/or any digital camera. The graphics hardware 87 may be implemented by most consumer level add-on AGP graphics cards produced today. The display device 88 may be implemented by a conventional cathode ray tube (CRT) display, a liquid crystal display (LCD) or in any other suitable display device that is adapted to present graphics to a user of the system 70. The user interface device 90 may be implemented by a keyboard, a touchscreen, a mouse or any other suitable device that allows a user to input information into the processing unit 72 via the input/output circuit 76.

Routines (described in detail below) that may be stored in memory 74 or external memory 84 and executed by the processing unit 72, are used to compress and store graphics information for later use. Additionally, the graphics hardware 87 of the system 70 is used to decompress and render graphics information for display to a user. These two general modes are referred to herein as image preparation and image rendering, respectively.

Generally, during image preparation, graphics information is provided to the processing unit 72 via the image acquisition device 86 and the input/output circuit 76. Alternatively, the graphics information may be previously stored in either the memory 74 or the external memory 84. Either way, the processing unit 72 accesses the graphics information, applies a mesh topology to the graphics information and calculates a BSRF for each vertex of the mesh topology. The processing unit 72 then partitions and approximates each vertex BSRF, before storing the partitioned and approximated BSRFs. As described below, partitioning may be carried out using incident/reflected parameterization or Gram-Schmidt parameterization.

As described in detail below, when graphics information is to be rendered, the graphics hardware 87 cooperates with the processing unit 72 to retrieve the partitioned and approximated graphics information and to reassemble such information into graphics for display on the display device 88. In such an arrangement, the graphics may be used for a computer game resident on the system 70 or for any other application in which graphics are used. Alternatively, the system 70 may not have the compressed and approximated graphics information stored thereon. In such cases, the compressed and approximated graphics information may be stored on a remote system (not shown) to which the system 70 may have access via the network 82. For example, the processing unit 72 may access compressed and approximated graphics information from another system over an intranet, the Intranet or over any other suitable network. Such an arrangement would be desirable in, for example, applications in which Internet web pages use graphics that, without being compressed and approximated, would require an enormous amount of bandwidth and time to display to a client.

Figure 4:
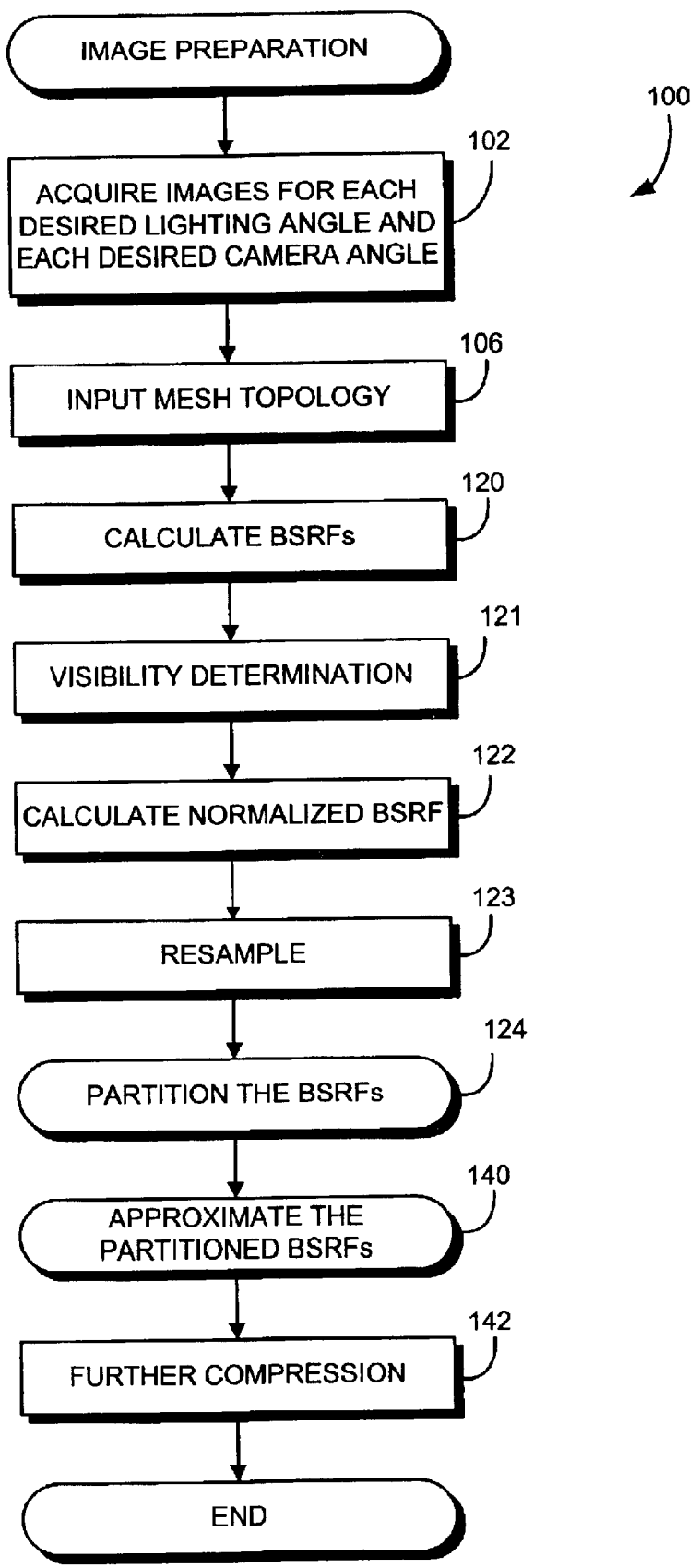
FIG. 4 is a flow diagram illustrating an example image preparation routine that may be executed by the processing unit of FIG. 3.
Figure 5:
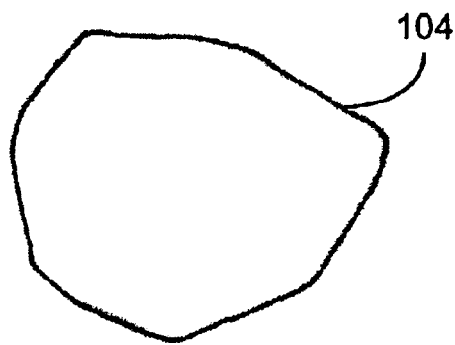
FIG. 5 is an illustration of an example object to be acquired and rendered.

Turning now to FIG. 4, an example image preparation routine 100, which may be stored in either the memory 74 or the external memory 84 for execution by the processing unit 72 is shown in representative flow diagram format. The routine 100 begins execution by acquiring images for each desired viewing angle and each desired lighting position (block 102). For example, referring back to FIG. 1, images of the object 20 may be acquired from each camera position 30, 32 for each lighting position 22–26. In practice, the images of the object 20 may be acquired from, for example, thirty positions under, for example, thirty different lightings, for a total of 900 images. Each of the 900 images, which may occupy several megabytes or more of storage space, may be stored in either the memory 74 or the external memory 84. One example view of an acquired object 104 is shown in FIG. 5. For clarity and illustrative purposes, the remainder of the discussion will focus on the single view of the object 104 shown in FIG. 5.

Figure 6:
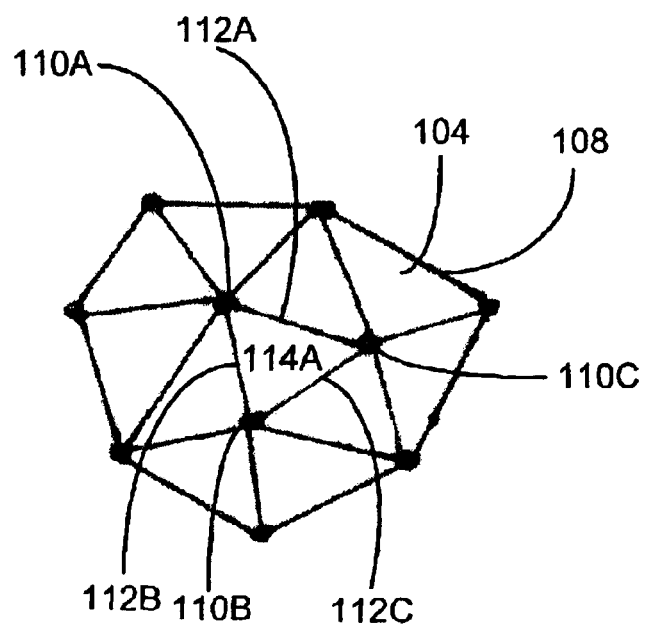
FIG. 6 is an illustration of the object of FIG. 5 having an example mesh topology applied thereto.

Returning to FIG. 4, after the images are acquired (block 102), a mesh topology is input for the object 104 (block 106). The mesh topology may be constructed before the images are acquired at block 102. Alternatively, one or more of the images acquired at block 102 may serve as a starting point for constructing the mesh topology. As a result, each of the views of the object 104 has a mesh topology 108 overlaid thereon, as shown in FIG. 6. The mesh topology may be, for example, a number of points, three of which are shown in FIG. 6 at reference numerals 110A, 110B and 110C, that are connected with vectors or lines, three of which are shown at reference numerals 112A, 112B and 112C, to form triangles, one of which is shown at reference numeral 114A (see FIG. 6). Of course, as will be readily appreciated, any suitable polygon other than a triangle may be used to form a mesh topology and the use of triangularly shaped polygons is merely an example of one such polygon topology.

After the mesh topology is applied to the acquired images, the processor 72 calculates a full BSRF for each sample (block 120). The process by which BSRFs are calculated is known, but the full BSRF representation entails a vast quantity of data. For example, a resampled vertex BSRF, which is described below, may require on the order of several hundred megabytes of storage space. Accordingly, direct representation and manipulation of BSRFs are not possible because of the 6D nature of BSRFs. As described in detail below, separable factorization of BSRFs and light field mapping are used to compress the information contained in the BSRFs.

Because not all triangles are visible from all directions, after the mesh topology is applied (block 120), the visibility of each triangle (e.g., the triangle 114A, see FIG. 6) in the mesh topology 108 is determined from each viewpoint by comparing the images acquired in block 102 to the camera locations used to acquire the images (block 121). For example, the triangle 114A may not be visible in images acquired from a camera angle on the opposite side of the object.

The largest reprojection size of each triangle, among all acquired images of that triangle (e.g., the largest size that the triangle appears in any of the acquired images), is used to sample the triangle from all visible acquired images (block 122). This process results in, for each triangle, a list of 2D images, each of which has an identical size and shape and is associated with a light source and camera position. The BSRF having the sampled normalized triangles is referred to as a renormalized triangle BSRF, which is saved to the memory 74 or the external memory 84 before resampling is carried out.

Resampling of the renormalized triangle BSRFs is then carried out in the lighting and viewing directions, referred to with vectors l and v in FIG. 1 (block 123). For each particular vertex, all of the renormalized triangle BSRF surrounding that vertex are loaded into memory 74. Triangle views that are not commonly visible from a particular view for the ring of triangles around the vertex are then discarded, which ensures that visual continuity is preserved about each vertex 110 of the mesh topology 108. For certain places on the object 104 where the curvature around a vertex 110 is high, the constraint of discarding triangles that are not commonly visible may be relieved.

If the BSRF function is to be manipulated in incident/reflected parameterization, then regularly resampling on the lighting and viewing directions through linear interpolation of the three closest ring triangle view is carried out. This dictates that the BSRF function is evaluated at the point (s, v, l), where variables (v, l) take values from the set $V_{nxn} \times L_{nxn}$, which is shown in Equation 4 below.

$$V_{nxn} = \{(x, y) \epsilon G | x^2 + y^2 \leq 1\},$$

$$L_{nxn} = \{(x, y) \epsilon G | x^2 + y^2 \leq 1\}$$

Where G is a grid of points defined by $$G = \left\{ \left( \frac{k}{n-1}, \frac{l}{n-1} \right), k = 0 \ldots n-1, l = 0 \ldots n-1 \right\} \quad \text{Equation 4}$$

In the general case, the resampling is a four dimensional (4D) interpolation problem. However, because of the data acquisition process, this problem can be reduced to a series of 2D interpolation problems. If the lighting direction is denoted as $l_i$ and for each lighting direction $l_i$, a set of images are taken at viewing directions $v^i_j$, all vectors $l_i$ may be collected and projected into 2D using an XY-map, and a 2D Delaunay triangulation may be constructed. For a fixed i, all vectors $v^i_j$ are collected and a 2D Delaunay triangulation for each of the groups is generated. These triangulations establish interpolation functions that allow the closest lighting and viewing directions to be queried together with the interpolation weights shown in Equation 5 below.

$$q_l: l \rightarrow \{(w_{k_1}, l_{k_1}), (w_{k_2}, l_{k_2}), (w_{k_3}, l_{k_3})\}$$

$$q_v^i: v \rightarrow \{(w^i_{m_1}, v^i_{m_1}), (w^i_{m_2}, v^i_{m_2}), (w^i_{m_3}, v^i_{m_3})\} \quad \text{Equation 5}$$

For incident/reflected parameterization, which is discussed below, the BSRF function may be resampled as shown in Equation 6.

$$f(s, v, l) = \sum_{i=1}^{3} w_{k_i} f(s, v, l_{k_i}) \quad \text{Equation 6}$$

$$= \sum_{i=1}^{3} w_{k_i} \sum_{j=1}^{3} \omega^{k_i}_{m_j} f\left(s, v^{k_i}_{m_j}, l_{k_i}\right)$$

In the case of half-vector parameterization, which is also discussed below, the resampling process is similar. First grids for variables h and d are formed as shown in Equation 7.

$$H_{n \times n} = \{(x, y) \in G | x^2 + y^2 \leq 1\},$$

$$D_{n \times n} = \{(x, y) \in G | x^2 + y^2 \leq 1\} \quad \text{Equation 7}$$

The resampled function $f(s, h, d)$ is then computed by first transforming the vector (h, d) into the incident/reflected parameterization (l, v) and applying Equation 6 for resampling.

In BSRF representation, the visibility of the light sources with respect to a surface do not need to be calculated, which implies that an image of a surface back-facing a light source should be incorporated in the BSRF. However, because the radiances of these images are typically quite small, the disclosed system parameterizes the light source direction on an upper hemisphere with respect to the surface, and discards the data from backward-facing light sources.

Figure 7:
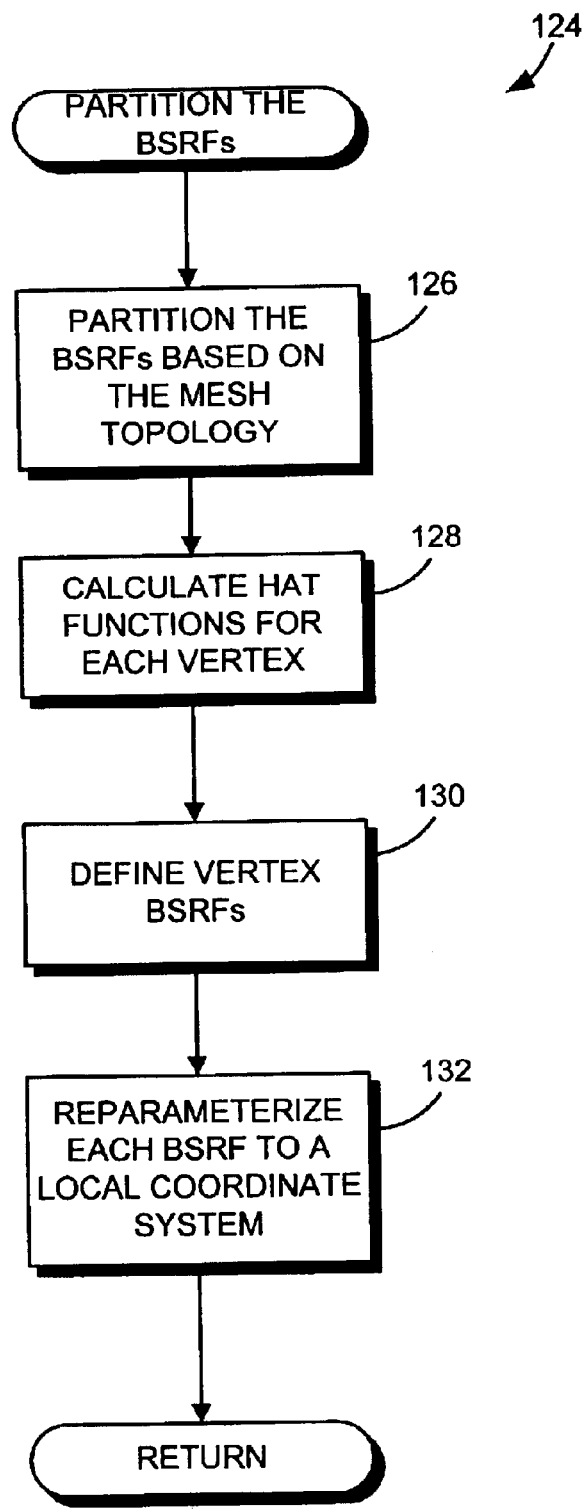
FIG. 7 is a flow diagram of an example partition the BSRFs routine.

After resampling is carried out (block 123), a routine 124 is executed by the processor 72 to partitions the BSRFs. The routine 124 is shown in further detail in FIG. 7. In general, to retain scalability of the system, the BSRFs are partitioned into local functions around vertices 110 of the mesh topology 108 (see FIG. 6) (block 126). The partitioning used is similar to that disclosed in Chen, "Light Field Mapping: Efficient Representation and Hardware Rendering of Surface Light Fields," to Appear in the Proceedings of SIGGRAPH 2002 (July 2002). The partitioning process divides the large BSRF function $f$ into multiple and separable vertex BSRFs $f^{v_j}$, where $f^{v_j}$ is defined in Equation 8.

$$f^{v_j}(s, l, v) = \Lambda^{v_j}(s) f(s, l, v) \quad \text{Equation 8}$$

In Equation 8, $\Lambda^{v_j}$ is referred to as a "hat function" that is defined as the barycentric weight around vertex $v_j$, as illustrated in FIGS. 8A–8D. Hat functions are calculated for each vertex (block 128). Generally, as shown in FIGS. 8A–8D, a hat function is calculated for each vertex (e.g., 110A–110C) defining the corners of a triangle of interest (e.g., 114A). The vertex hat functions represent the radiance contributions of mesh components surrounding each vertex of the triangle of interest. Because the hat functions are barycentric, the sum of the vertex hat function's surrounding a particular triangle is unitary.

Figure 8A:
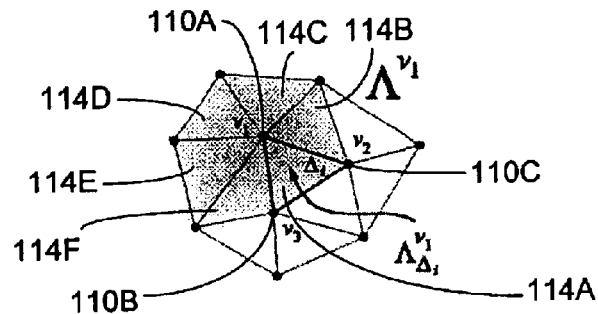
FIGS. 8A–8D are illustrations of an example partitioning of the object of FIG. 6.
Figure 8B:
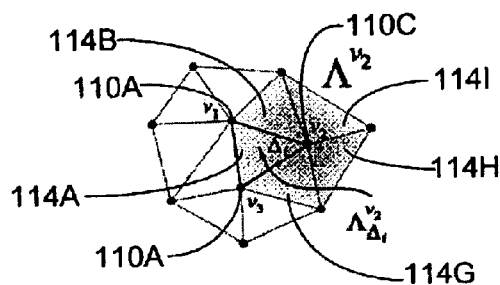
Figure 8C:
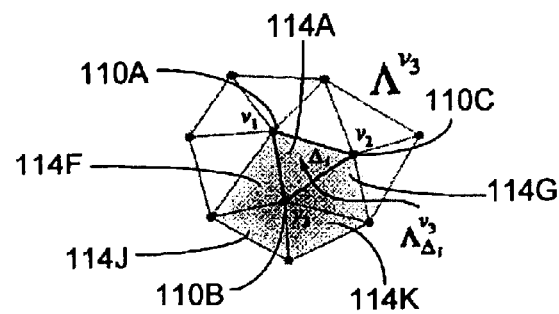
Figure 8D:
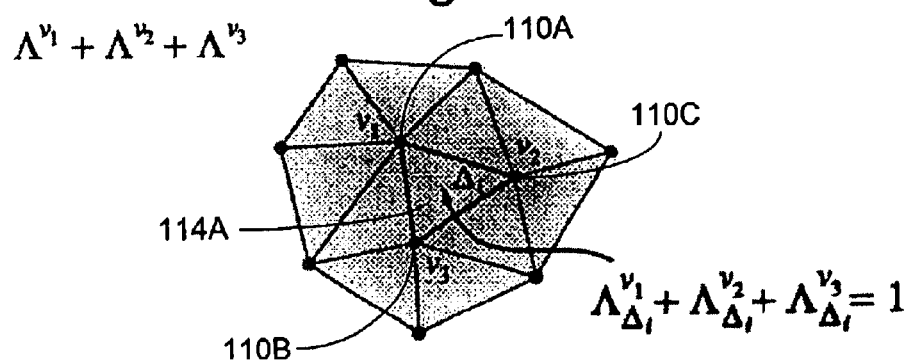

In particular, referring to FIG. 8A, when determining the radiance contribution of vertex 110A to the total radiance of the triangle 114A, triangles 114A–114F surrounding vertex 110A are considered and the hat function $\Lambda^{v_1}$ is calculated based thereon. Similarly, as shown in FIG. 8B, the contribution by vertex 110C is determined by considering contributions from triangles 114A, 114B and 114G–114I and calculating $\Lambda^{v_2}$ therefrom. The contribution due to the vertex 110B, as shown in FIG. 8C, is determined by considering the contributions from triangles 114A, 114F, 114G, 114J and 114K and calculating $\Lambda^{v_3}$. As shown in FIG. 8D, the radiance of triangle 114A is approximated as a sum of the hat functions of the surrounding vertices 110A–110C. Within each triangle $\Delta_i$, the sum of all three vertex BSRFs thereof is equal to the original function $f$. Because the hat functions are $C^0$ continuous, the set $\{f_{v_j}\}$, j=1,2, ... N defines a $C^0$ partitioning of the target BSRF over vertices $v_j$, j=1,2, ... N.

The hat functions calculated at block 128 are used to approximate each vertex BSRF independently without producing visible discontinuity artifacts (block 130). If $a(i_1, i_2, i_3)$ is denoted as vector a expressed in the coordinate system spanned by $(i_1, i_2, i_3)$, a partitioned vertex BSRF is expressed as $f^{v_j}(s, l(x, y, z), v(x, y, z))$, where (x, y, z) is the global coordinate system. The vertex BSRFs are determined by multiplying the full BSRF by the hat functions of each vertex. The result is a number of vertex BSRFs that correspond to each vertex 110 in the mesh topology 108.

After individual vertex BSRFs $f^{v_j}$ are determined at block 130, each vertex BSRF is reparameterized to a local coordinate system (block 132). Reparameterization may be carried out using incident/reflected parameterization or by using the Gram-Schmidt Half-vector, each of which is discussed below.

Incident/reflected parameterization entails reparameterizing functions $f^{v_j}$ on a local coordinate system for each vertex $v_j$ to obtain the classic incident/reflected parameterization with respect to the newly assigned local coordinate system. Each vertex coordinate system is defined by the orthonormal vectors (n, s, t), where n is a vector that is normal to the surfaces of the triangles surrounding the vertex under consideration and s and t are the remaining orthonormal components. The surface parameters s are parameterized using the barycentric coordinate around vertex $v_j$. Accordingly, the reparameterized functions $f^{v_j}$ may be defined $f^{v_j}(s, l(n, s, t), v(n, s, t))$. The vector mathematics associated with incident/reflected parameterization will be readily apparent to those having ordinary skill in the art.

Figure 9:
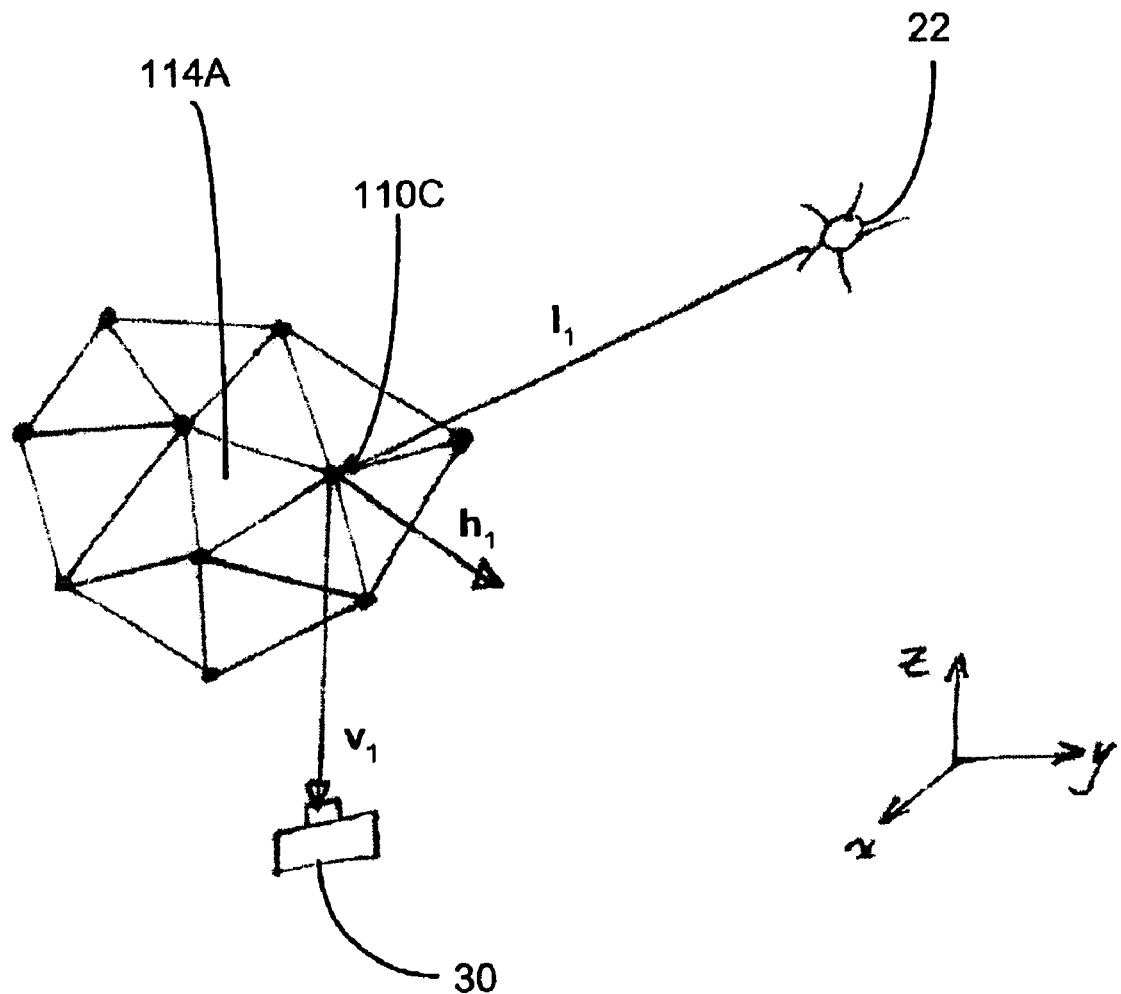
FIG. 9 is an illustration of an example reparameterization of one vertex of the object of FIG. 6.

Alternatively, parameterization using the Gram-Schmidt half vector may be carried out to further improve the separability of the vertex BSRF function. Such a parameterization is described in Kautz, J., "Interactive Rendering with Arbitrary BRDFs using Separable Approximations," Eurographics Rendering Workshop 1999 (June 1999). A graphical representation of the process of Gram-Schmidt half vector reparameterization is shown in FIG. 9 with respect to vertex 110C. First, a half vector $h_1$, which has a direction equivalent to $l_1+v_1$, where $l_1$ is the lighting vector and $v_1$ is the view vector, is calculated. The vector $h_1$ is referred to as the half vector because, as shown in FIG. 9, it is half way between the $l_1$ and $v_1$ vectors. As will be readily appreciated, each vertex of the mesh topology will have a different half vector because the vectors between a given light source and a given viewing location change as the location of the vertex being considered changes.

After the vector h is determined for a vertex, a new coordinate system is defined as (h, s', t') by the Gram- Schmidt orthonormalization of vectors (h, s, t). The reparameterized vertex BSRF is then expressed as $f^{v_j}(s, h(n, s, t), d(h, s', t'))$. After each vertex BSRF has been reparameterized, control returns to routine 140 of FIG. 4, which approximates the partitioned BSRFs.

Figure 10:
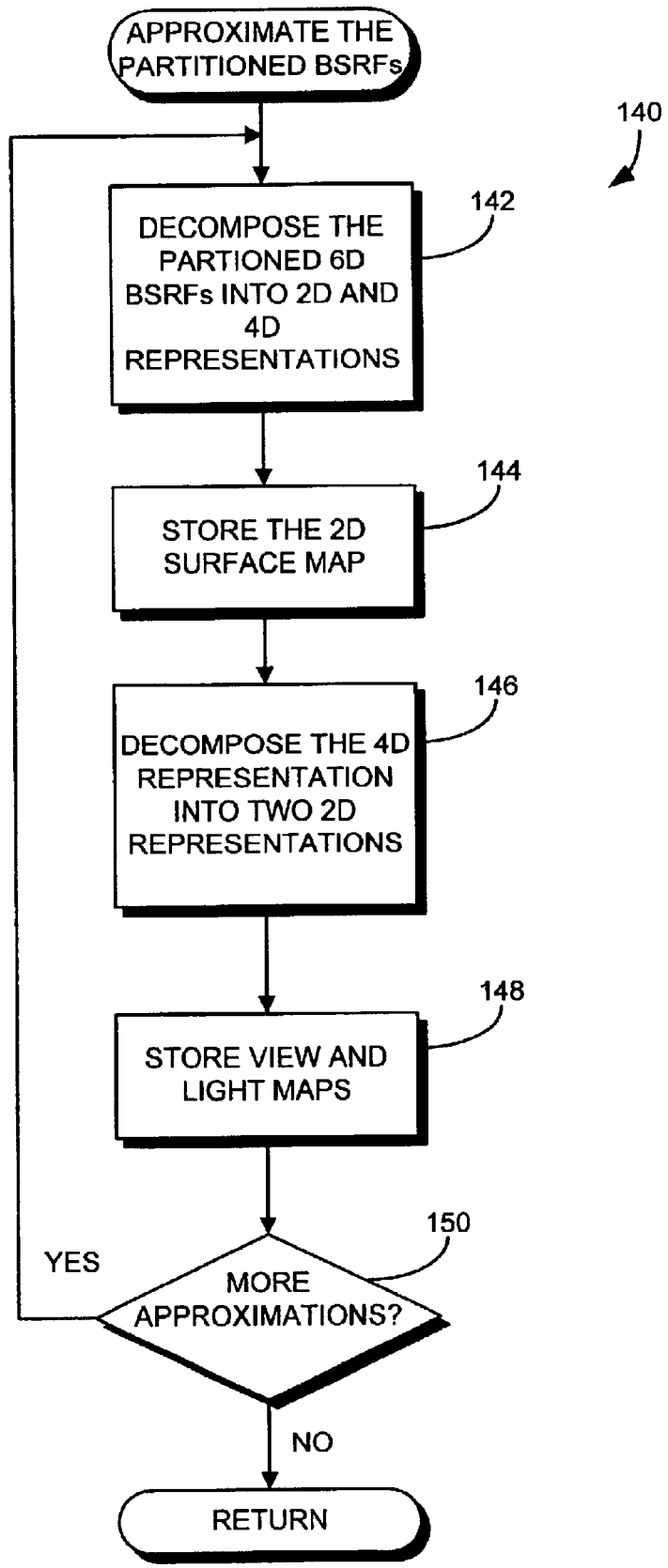
FIG. 10 is an illustration of an example approximate the partitioned BSRFs routine.

As shown in FIG. 10, at block 142 the decomposer 50 decomposes the partitioned 6D BSRFs into 2D and 4D representations. As will be readily appreciated by those having ordinary skill in the art and as described below, a 6D BSRF may be represented as a 3D matrix of 2D functions. After reparameterization, the vertex BSRFs are available as a discrete function through resampling. These functions are represented as $f^{v_j}(s, \omega_1, \omega_2)$, where $(\omega_1, \omega_2) \equiv (l(n, s, t), v(n, s, t))$ for the classic incident/reflected parameterization, and $(\omega_1, \omega_2) \equiv (h(n, s, t), d(h, s', t'))$ for the Gram-Schmidt half vector parameterization. As a first step, the discrete function is transformed into a 3D matrix $F=\{F_{l,m,n}\}$, where l, m, n are combined indices of (u, v), h and d, respectively. The components of the 3D matrix F are approximated as shown in Equation 9.

$$F_{l,m,n} \cong \sum_{i=0}^{k-1} u_l^i v_m^i w_n^i \quad \text{Equation 9}$$

Equation 9 denotes the k-term approximation of matrix F, in which the u, v and w components may be referred to as surface, view and light maps, respectively. Although Principal Component Analysis (PCA) algorithms can be used to calculate 2D matrix factorization, these algorithms need to be modified to accommodate for 3D matrix factorization. As described below, a two-step process is used that first initializes the principal vectors and then refines them to obtain better approximation.

To carry out the initialization process, a modified and efficient variant of principal component analysis (PCA), called EMPCA is used. EMPCA was proposed by Roweis in "EM Algorithms for PCA and SPCA," in the book entitled "Advances in Neural Information Processing Systems," vol. 10, which was published by The MIT Press in 1998. EMPCA is efficient at decomposing large matrices when only a few eigenvectors corresponding to the largest eigenvalues are needed. The primary advantage of EMPCA is its online mode, which allows calculation of PCA without simultaneously loading the entire matrix into memory 74. Briefly, EMPCA uses interpolated data generated in the resampling stage as online training vectors for the decomposition algorithm. The decomposition process may be implemented using the Math Kernal Library from Intel Corporation, which contains an optimized BLAS library for the PC.

The initialization process operates as described below. First, the 3D matrix F is rearranged to from dimensions of L×M×N into a 2D matrix $\Gamma=\{\Gamma_{l,q}\}$. In this process, the angular parameter dimensions are combined into one index q, and the matrix $\Gamma$ becomes a L×MN matrix. Next a one-term PCA of $\Gamma$, denoted as $u^0(\gamma^0)^T$, where $u^0$ is a left eigenvector of $\Gamma$, which is referred to as the surface map and where $\gamma^0$ is a combination of the view and light maps. At this point, the decomposer 50 stores the surface map $u^0$ in either the memory 74 or the external memory 84 (block 144).

The decomposer 50 then, decomposes the remaining 4D representation into two, 2D representations by rearranging $\gamma^0$ into a 2D matrix and taking a one-term PCA thereof (block 146). The one-term PCA is denoted as $v^0(w^0)$ and this estimation of $\gamma^0$ is denoted as $\gamma^0$. The terms $v^0$ and $w^0$ represent the view and light maps, respectively. After developing the 2D representations, (block 146), the view and light maps ($v^0$ and $w^0$, respectively) are stored (block 148).

After the view and light maps have been stored (block 148), the decomposer 50 determines if more approximations are desired. Typically, for PCA, three approximations are sufficient, but, as will be readily appreciated, any other number of suitable approximations may be used. If more approximations are desired, control passes from block 150 back to block 142.

In one implementation, XY-maps may be used to generate texture maps for $\alpha_i$ and $\beta_i$ in the decomposed approximations. An XY-map texture map reprojects a 3D unit vector onto a 2D surface by discarding the Z component of the 3D vector. Because the Z components of both the incident/reflected parameterization and the Gram-Schmidt parameterization are positive, XY-mapping does not present a problem.

The full parameterization on lighting directions will require one additional XY-map for either of the vectors l and h. Such an implementation requires the rendering process to be slightly modified to bind the correct texture map before rendering.

To improve rendering efficiency, the texture maps $\alpha_i$ and $\beta_i$ are collected into larger texture maps. The collection process is performed to improve the access coherency of texture maps. The collection process is carried out by dividing the model into server connected partitions. The texture maps of $g_i$, $\alpha_i$ and $\beta_i$ corresponding to the same partition and same approximation term are then collected to form larger texture maps. The ultimate size of the collected texture maps is a trade-off between graphics memory bus utilization efficiency and overhead associated with texture switching.

If more approximations are desired, the error approximation shown in Equation 10 is used as the input matrix for finding the next approximation terms, which are shown in Equation 11.

$$F^1_{l,m,n} = F_{l,m,n} - \tilde{F}^0_{l,m,n} \quad \text{Equation 10}$$
$$= F_{l,m,n} - u_l^0 v_m^0 w_n^0$$

$$\tilde{F}^i_{l,m,n} = u_l^i v_m^i w_n^i,$$

$$F_{l,m,n}^{i+1} = F_{l,m,n}^i - \tilde{F}^i_{l,m,n} \quad \text{Equation 11}$$

The process proceeds until a desirable error threshold or number of approximation terms is reached.

To prove the convergence of the above process, Equation 11 can be rewritten in 2D form as Equation 12, shown below.

$$\Gamma^{i+1} = \Gamma^i - u^i(\gamma^i)^T \quad \text{Equation 12}$$

The singular-value decomposition of $\Gamma$ is denoted as $UV^T$ where the singular values are absorbed into V for simplicity. The vector $u^i$ is the singular vector corresponding to the largest singular value of $\Gamma$ and is thus equal to the first column of U. The variable $v^j$ is denoted as the $j^{th}$ column of V. Equation 12 above now takes the form of Equation 13.

$$\Gamma^{i+1} = UV^T - u^i(\gamma^{i'})^T \quad \text{Equation 13}$$
$$= U(V'),$$

where

-continued $$V' = [(v^0 - g^i), v^1, \ldots, v^{MN}]$$

The vector $(v^0-g^i)/|v^0-g^i|$ is a right eigenvector of $\Gamma^{i+1}$ corresponding to the left eigenvector $u^i$. Because $g^i$ is a linearized one-term approximation of $v^0$, $|v^0-g^i|<|v^0|$. Accordingly, $|v^0|$ and $|v^0-g^i|$ are singular values of $\Gamma^i$ and $\Gamma^{i+1}$, respectively, and all singular values of $\Gamma^{i+1}$ are otherwise equivalent to the ones in $\Gamma^i$. Because the squared sum of elements in a matrix is equivalent to the squared sum of all its singular values, the squared sum of $\Gamma^{i+1}$ is thus lower than $\Gamma^i$, and, therefore, Equation 11 converges. Alternatively, if no more approximations are desired, the routine 140 returns control to the routine 100 of FIG. 4.

As an alternative to the foregoing described process, to further enhance the results of decomposition, a pseudo-single value decomposition (SVD) technique has been proposed independently by Carroll and Chang in "Analysis of Individual Differences in Multidimensional Scaling Via an N-Way Generalization of Eckart-Young Decomposition," published in Psychometrica 35, 3 (1970), pp 283–319. A similar approach was also suggested by Harshman in "Foundations of Parafac Procedure: Models and Conditions for an Explanatory Multi-Modal Factor Analysis," published in the UCLA Working Papers in Phonetics 16 (1970), pp. 1–84. For a budget of k-term approximation, these processes find a local minimum by fixing two out sets of vectors and linearly solving for the third set. The process proceeds as follows. First, an error matrix, as shown in Equation 14 is defined.

$$E_{l,m,n}^k = \left\| F_{l,m,n} - \sum_{i=0}^{k-1} u_l^i v_m^i w_n^i \right\|$$ Equation 14

Next, a 3D matrix is defined as $A_{l,m,i}=u_l^i v_m^i$. The matrix F is then reorganized into a 2D matrix F' by combining indices (l, m) into one index. The matrix A is also reorganized into a 2D matrix A' in a similar fashion. The above error equation 14 can be written in matrix notation as shown below in Equation 15.

$$E_k = \|F'^T - A'w\|$$ Equation 15

Wherein, w is an N×k matrix consisting of vectors $w^i$. Given fixed F' and A', error $E_k$ is minimized by setting w=pinv(A') $F'^T$, where pinv(·) denotes the pseudo-inverse of a matrix. The process then performs the same steps for u, v and w repeatedly until there is convergence.

The refinement stage can be performed relatively efficiently. Because matrix A' is full-rank, the pseudo-inverse of pinv(A') can be calculated without calculating SVD. The bottleneck of multiplying pinv(A') and $F'^T$ can be carried out in online mode without bringing the entire matrix F' into the processing unit 72.

Rendering using the factorized BSRF representation developed above includes manipulation of three group functions ($g_i$, $\alpha_i$ and $\beta i$) per approximation term i for each vertex of each triangle in the mesh topology 108. The BSRF function is reconstructed by evaluating each group of functions using Equation 3 for each surface element, adding the results together, drawing the triangles with correct visibility and displaying the graphics to the user on the display device 88.

Returning to FIG. 4, after the routine 140 has completed execution, block 142 may further compress the light, view and surface maps. This can be done using standard image compression techniques that allow for fast decompression in graphics hardware. One example of such techniques is vector quantization (VQ), which groups light, view and surface maps based on their appearance similarity and then represents each group by the most representative individual of the group. Another example is the use of hardware compression techniques that are commonly implemented on graphics hardware that is available today, such as, for example, S3TC.

Figure 11:
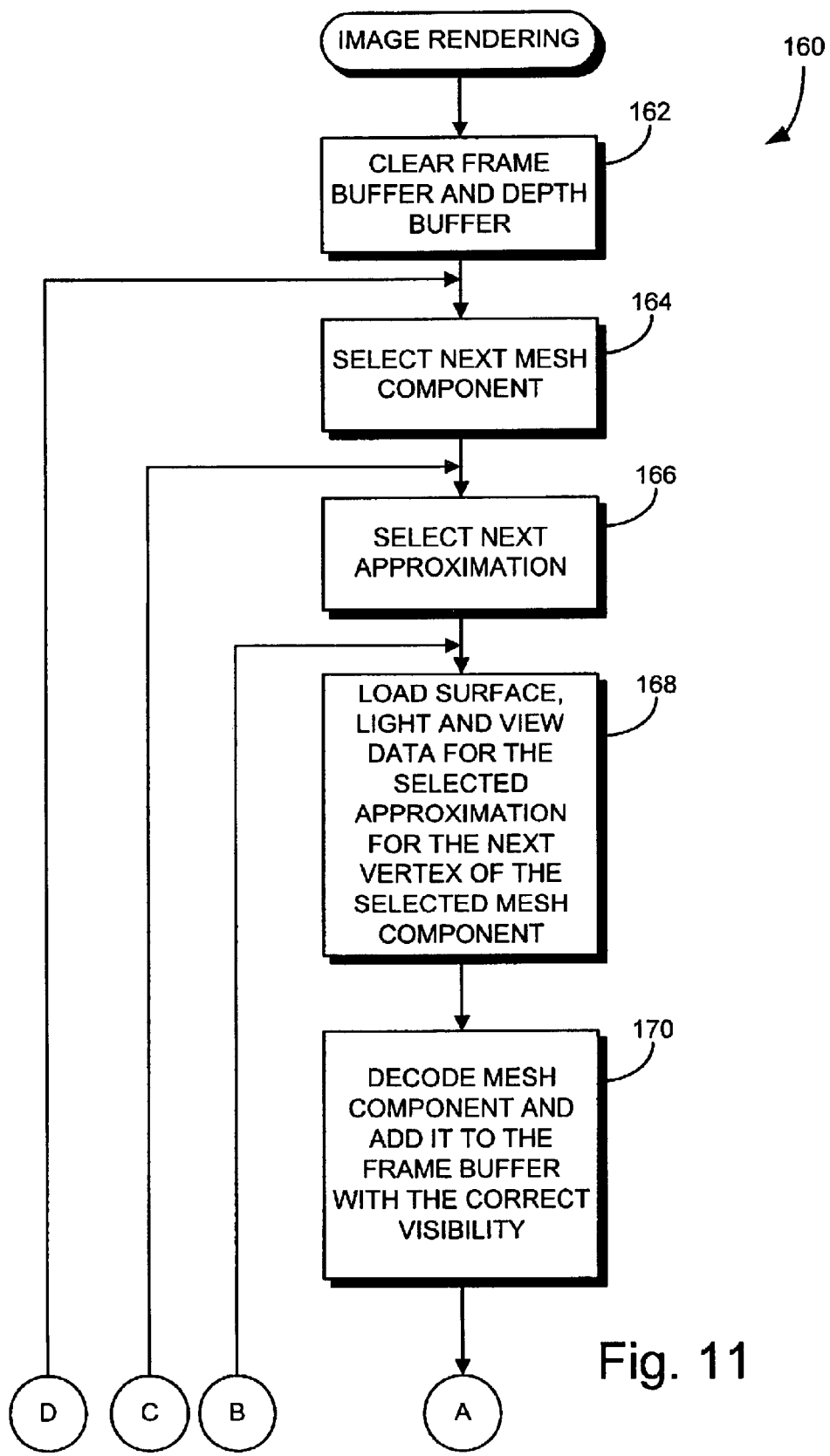
FIGS. 11 and 12 collectively form a flow diagram of an example image rendering routine.

FIG. 11 illustrates an example image rendering routine 160, which may be carried out by the graphics hardware 87, the processing unit 72 or any combination thereof. The routine 160 begins operation at block 162, where a frame buffer and depth buffer, each of which may be in the graphics hardware 87, are cleared. Control then passes to block 164, which selects the next mesh component (e.g., the next mesh polygon, which in the foregoing exemplary description, is a triangle), before passing control to block 166, which selects the next approximation of the BSRF that is to be rendered. The graphics hardware 87 loads the light, surface and view maps for the next vertex of the selected approximation and the selected mesh component (block 168).

At block 170, the light, surface and view maps are decoded for the selected mesh component and the selected approximation and the results of the decoding are added to the frame buffer with the correct visibility. Vertices are colored using the intended light source irradiance. The decoded BSRF is obtained by modulating the vertex color with the product of texture maps g, l and h.

Block 172 determines if there are more vertices in the mesh component and if there are, passes control back to block 168. If, however, there are no more vertices to be considered in the selected mesh component, control passes from block 172 to block 174, which determines if more approximations are desired. If more approximations are desired, control passes back to block 166. Conversely, if no more approximations are desired, control passes from block 174 to block 176, which determines if there are more mesh components to consider. If there are more mesh components to consider, control passes back to block 164. Alternatively, if all vertices of all mesh components have been considered for the appropriate number of approximations, the routine 160 ends and the frame buffer is displayed to the user.

The rendering process described above may be implemented in efficient BSRF renderers that exploit commodity graphics hardware features. First of all, decomposed BSRF functions are 2D functions and can be stored in the graphics hardware 87 as textures. The decoding of BSRFs (performed at block 170) requires pixel-by-pixel multiplication, which is supported in the graphics hardware 87 via multi-texturing operations. Multi-term approximations are rendered using multiple passes of the routine 160 and on each pass information is written into the frame buffer.

While the foregoing description of FIG. 11 addresses rendering in a general manner, the following description provides further detail on two cases of hardware-accelerated rendering, namely point light source and environment mapping. Because each rendering pass for each triangle proceeds identically, for simplicity, the following focuses on rendering one term approximation for one vertex BSRF within a triangle. The corresponding decomposed BSRF maps are denoted as simply as g, l, and h.

Figure 12:
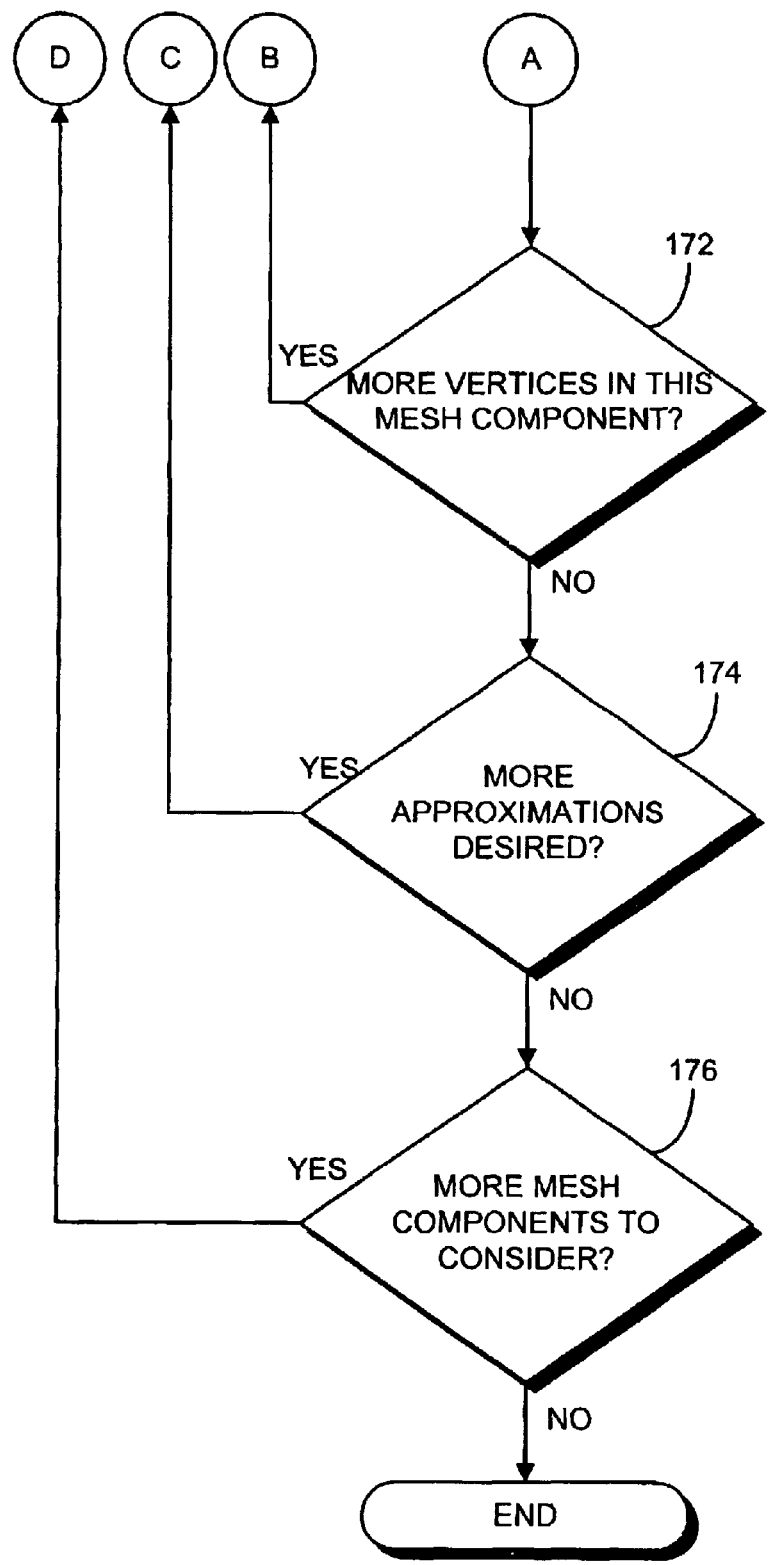

When rendering a decomposed BSRF scene with one single point light source, three texture units are used in the hardware, one for each of the texture maps g(s), $\alpha(\omega_1)$ and $\beta(\omega_2)$. For all three vertices within the triangle, we calculate the texture coordinates for $l_i$ and $h_i$ based on the light source position and viewing direction. The function $g_i$ is parameterized on surfaces and thus does not need to be calculated on a per-frame basis. The texture coordinate within the triangle are linearly interpolated, which works well for both incident/reflected and Gram-Schmidt Half-vector parameterizations. In cases involving multiple light sources, the rendering procedure may simply render multiple passes using the process described in FIGS. 11 and 12. Accordingly, the rendering cost grows linearly with the number of light sources.

When the scene include only directional light sources, and when the incident/reflected parameterization is used, the number of texture units can be reduced by one, because the texture coordinate for $\alpha(\omega_1)$ is identical everywhere within the triangle. Two aspects of the rendering process may be modified as follows. First, a light source direction $\omega^0_1$ is calculated with respect to the local coordinate on the vertex, and $\alpha_0 = \alpha(\omega^0_1)$ is evaluated. The term $\alpha_0$ is them multiplied by light source intensity I and the vertex color is set as $I \cdot I_0$. Then the vertex color is modulated with the product of the texture map g and $\beta$ to obtain the decoded BSRF. Second, because a distant viewer will have almost a parallel projection, the texture coordinates of $\beta$ may be identical for all vertices and, therefore, the number of required texture units may be reduced to one.

To render environments, the rendering equation for the BSRF representation in Equation 2 can be rewritten in discrete, decomposed format, as shown in Equation 16.

$$I(s, v) = \sum_l f(s, l, v) E[l] \qquad \text{Equation 16}$$

$$\sum_l \sum_{i=0}^{k-1} g_i(s) \alpha_i(\omega_1) \beta_i(\omega_2) E[l]$$

Wherein E[l] is a subsampled environment map.

In the case of incident/reflected parameterization, the above equation can be written as shown in Equation 17.

$$I(s, v) = \sum_{i=0}^{k-1} g_i(s) \beta_i(v) \left( \sum_l \alpha_i(v) E[l] \right) \qquad \text{Equation 17}$$

In Equation 17, the inner summation is independent of the output parameters (s, v), and once this summation is evaluated, it may be assigned in the vertex color and two texture units may be used for each of g and $\beta$ to calculate the final rendering.

The inner summation of Equation 17 represents a vector-vector inner product. If functions $\alpha_i$ are parameterized for all vertices in the global coordinate system, the inner product may be calculated efficiently for all vertices using a matrix-vector multiplication operation. For a 3-term decomposition model with 3000 vertices and a 16×16 size of $\alpha_i$, this multiplication requires 2.3 million MPEG audio decoder (MAD) operations.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of representing surface radiance of an object based on acquired images of the object taken from a view point with lighting provided from a lighting point, the method comprising:

accessing data representing the acquired images;

calculating, from the data representing the acquired images, radiance functions representing the surface radiance of the object, wherein each radiance function has a first dimensionality;

partitioning the radiance functions based on a mesh topology to create a number of a vertex radiance functions;

reparameterizing each vertex radiance function to a local coordinate system based on the view point and the lighting point to produce reparameterized vertex radiance functions; and decomposing the reparameterized vertex radiance functions into a first representation having a second dimensionality and a second representation having a third dimensionality, wherein each of the second and third dimensionalities has fewer dimensions than the first dimensionality.

2. The method as defined in claim 1, wherein decomposing the reparameterized vertex radiance function comprises the use of principle component analysis.

3. The method as defined in claim 1, further comprising decomposing the second representation into third and fourth representations, wherein each of the third and fourth representations has the same dimensionality as the first representation.

4. A method of representing surface radiance of an object based on acquired images of the object taken from a view point with lighting provided from a lighting point, the method comprising:

accessing data representing the acquired images;

applying a mesh topology to the acquired images, wherein the mesh topology includes a plurality of vertices connected to form polygons;

calculating, from the data representing the acquired images, radiance functions representing the surface radiance of the object, wherein each radiance function has a first dimensionality;

partitioning the radiance functions based on the mesh topology to create a number of a vertex radiance functions, wherein each vertex radiance function has the first dimensionality;

reparameterizing each vertex radiance function to a local coordinate system based on the view point and the lighting point to produce reparameterized vertex radiance functions having the first dimensionality; and decomposing the reparameterized vertex radiance functions into a first representation having a second dimensionality and a second representation having a third dimensionality, wherein each of the second and third dimensionalities has fewer dimensions than the first dimensionality.

5. The method as defined in claim 4, wherein partitioning the radiance functions comprises determining a weighting function for each vertex in the mesh topology and combining the weighting functions with the radiance functions to determine the vertex radiance functions.

6. The method as defined in claim 4, wherein the first dimensionality comprises six dimensions.

7. The method as defined in claim 4, wherein the second dimensionality comprises two dimensions.

8. The method as defined in claim 4, wherein reparameterizing the vertex radiance functions comprises determining a half vector for each vertex of the mesh topology based on the lighting point and the view point.

9. The method as defined in claim 8, wherein the half vector is determined according to a Gram-Schmidt process.

10. The method as defined in claim 4, wherein reparameterizing the vertex radiance functions comprises determining a normal vector for each vertex.

11. The method as defined in claim 10, wherein the normal vector is determined according to an incident/reflected process.

12. The method as defined in claim 4, wherein the third dimensionality comprises four dimensions.

13. The method as defined in claim 12, further comprising decomposing the second representation into third and fourth representations, wherein each of the third and fourth representations has the same dimensionality as the first representation.

14. The method as defined in claim 13, further comprising storing the first, third and fourth representations.

15. The method as defined in claim 14, wherein the first, third and fourth representations comprise surface, light and view maps.

16. The method as defined in claim 4, wherein the radiance functions comprise bidirectional surface radiance functions.

17. A machine accessible medium storing a software program, the software program being structured to cause an apparatus to:
   access data representing the acquired images;
   apply a mesh topology to the acquired images, wherein the mesh topology includes a plurality of vertices connected to form polygons;
   calculate, from the data representing the acquired images, radiance functions representing the surface radiance of the object, wherein each radiance function has a first dimensionality;
   partition the radiance functions based on the mesh topology to create a number of a vertex radiance functions, wherein each vertex radiance function has the first dimensionality;
   reparameterize each vertex radiance function to a local coordinate system based on the view point and the lighting point to produce reparameterized vertex radiance functions having the first dimensionality; and
   decompose the reparameterized vertex radiance functions into a first representation having a second dimensionality and a second representation having a third dimensionality, wherein each of the second and third dimensionalities has fewer dimensions than the first dimensionality.

18. The machine accessible medium as defined in claim 17, wherein the software program is further structured to cause the apparatus to partition the radiance functions by determining a weighting function for each vertex in the mesh topology and to combine the weighting functions with the radiance functions to determine the vertex radiance functions.

19. The machine accessible medium as defined in claim 17, wherein the software program is further structured to cause the apparatus to reparameterize the vertex radiance functions by determining a half vector for each vertex of the mesh topology based on the lighting point and the view point.

20. The machine accessible medium as defined in claim 19, wherein the software program is further structured to cause the apparatus to determine the half vector according to a Gram-Schmidt process.

21. The machine accessible medium as defined in claim 17, wherein the software program is further structured to cause the apparatus to reparameterize the vertex radiance functions by determining a normal vector for each vertex.

22. The machine accessible medium as defined in claim 17, wherein the software program is further structured to cause the apparatus to determine the normal vector according to an incident/reflected process.

23. The machine accessible medium as defined in claim 17, wherein the software program is further structured to cause the apparatus to decompose the second representation into third and fourth representations, wherein each of the third and fourth representations has the same dimensionality as the first representation.

24. A system for representing surface radiance of an object based on acquired images of the object taken from a view point with lighting provided from a lighting point, the system comprising:
   a decomposer adapted to:
      access data representing the acquired images;
      apply a mesh topology to the acquired images, wherein the mesh topology includes a plurality of vertices connected to form polygons;
      calculate, from the data representing the acquired images, radiance functions representing the surface radiance of the object, wherein each radiance function has a first dimensionality;
      partition the radiance functions based on the mesh topology to create a number of a vertex radiance functions, wherein each vertex radiance function has the first dimensionality;
      reparameterize each vertex radiance function to a local coordinate system based on the view point and the lighting point to produce reparameterized vertex radiance functions having the first dimensionality;
      decompose the reparameterized vertex radiance functions into a first representation having a second dimensionality and a second representation having a third dimensionality, wherein each of the second and third dimensionalities has fewer dimensions than the first dimensionality; and
      decompose the second representation into third and fourth representations, wherein each of the third and fourth representations has the same dimensionality as the first representation; and
   a renderor adapted to access the first, third and fourth representation and to render a graphical image of the object based thereon.

25. The system as defined in claim 24, wherein the decomposer is further adapted to partition the radiance functions by determining a weighting function for each vertex in the mesh topology and to combine the weighting functions with the radiance functions to determine the vertex radiance functions.

26. The system as defined in claim 24, wherein the decomposer is further adapted to reparameterize the vertex radiance functions by determining a half vector for each vertex of the mesh topology based on the lighting point and the view point.

27. The system as defined in claim 26, wherein the decomposer is further adapted to determine the half vector according to a Gram-Schmidt process.

28. The system as defined in claim 24, wherein the decomposer is further adapted to reparameterize the vertex radiance functions by determining a normal vector for each vertex.

29. The system as defined in claim 24, wherein the decomposer is further adapted to determine the normal vector according to an incident/reflected process.

* * * * *